United States Patent
Bedikian

(10) Patent No.: US 10,600,189 B1
(45) Date of Patent: Mar. 24, 2020

(54) OPTICAL FLOW TECHNIQUES FOR EVENT CAMERAS

(71) Applicant: Apple Inc., Cupertino, CA (US)

(72) Inventor: Raffi A. Bedikian, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/539,416

(22) Filed: Aug. 13, 2019

Related U.S. Application Data

(63) Continuation of application No. 15/833,804, filed on Dec. 6, 2017, now abandoned.

(60) Provisional application No. 62/430,859, filed on Dec. 6, 2016.

(51) Int. Cl.
*G06T 7/00* (2017.01)
*G06T 7/246* (2017.01)
*G06T 7/73* (2017.01)
*G06T 7/13* (2017.01)
*G06F 3/00* (2006.01)

(52) U.S. Cl.
CPC ........... *G06T 7/246* (2017.01); *G06T 7/13* (2017.01); *G06T 7/73* (2017.01); *G06T 2207/10016* (2013.01)

(58) Field of Classification Search
CPC ............. G06K 9/00; G06F 3/00; G06T 7/00
USPC .......................................................... 382/107
See application file for complete search history.

(56) References Cited

U.S. PATENT DOCUMENTS 10,043,064 B2 * 8/2018 Wang .................. G06K 9/209
10,203,762 B2 * 2/2019 Bradski ............... G02B 27/225

OTHER PUBLICATIONS

Bardow, et al., "Simultaneous Optical Flow and Intensity Estimation from an Event Camera," Computer Vision and Pattern Recognition (CVPR), 2016 IEEE Conference on, Jun. 27-30, 2016.
Brandli, Christian Peter, "Event-Based Machine Vision," A thesis submitted to attain the degree of Doctor of Sciences of ETH Zurich, 2015.

* cited by examiner

Primary Examiner — Abolfazl Tabatabai
(74) Attorney, Agent, or Firm — Blank Rome LLP

(57) ABSTRACT

Determining a movement of an object may include obtaining an event stream corresponding to a scene over time, wherein the event stream includes events associated with detected changes in brightness, wherein each event includes a pixel location, a timestamp, and a brightness indication; selecting a first subset of pixels from the plurality of pixels corresponding to an object for a first time period; determining a first movement of the object based on the brightness indications and timestamps for the first subset of pixels; determining that the first movement is insufficient to generate a velocity measure; selecting, based on the first movement, a second subset of pixels associated with the object for a second time period; determining an updated movement of the object based on the brightness indications and timestamps for the second subset of pixels and the first movement; and generating a velocity measure based on the updated movement.

20 Claims, 6 Drawing Sheets

OPTICAL FLOW TECHNIQUES FOR EVENT CAMERAS

BACKGROUND

This disclosure relates generally to the field of digital signal processing, and more specifically to the field of optical flow techniques for event cameras.

Traditional cameras capture and transmit information as frames containing the intensity value for every pixel. Event cameras are inspired by the biological retina, and transmit intensity information asynchronously for each pixel to form a continuous stream. Each event may consist of the pixel location, timestamp, and whether the pixel has increased or decreased in brightness. An event may be transmitted for a particular pixel within a few microseconds of the intensity change. Thus, one benefit of an event camera is low latency when compared to a traditional camera.

SUMMARY

In one embodiment, a method for utilizing optical flow is described. The method may include obtaining an event stream corresponding to a scene over time, wherein the event stream includes events associated with detected changes in brightness, wherein each event includes a pixel location, a timestamp, and a brightness indication; selecting a first subset of pixels from the plurality of pixels corresponding to an object for a first time period; determining a first movement of the object based on the brightness indications and timestamps for the first subset of pixels; determining that the first movement is insufficient to generate a velocity measure; selecting, based on the first movement, a second subset of pixels associated with the object for a second time period; determining an updated movement of the object based on the brightness indications and timestamps for the second subset of pixels and the first movement; and generating a velocity measure based on the updated movement.

In another embodiment, the method may be embodied in computer executable program code and stored in a non-transitory storage device. In yet another embodiment, the method may be implemented in an electronic device having image capture capabilities or event capture capabilities.

DETAILED DESCRIPTION

Figure 1:
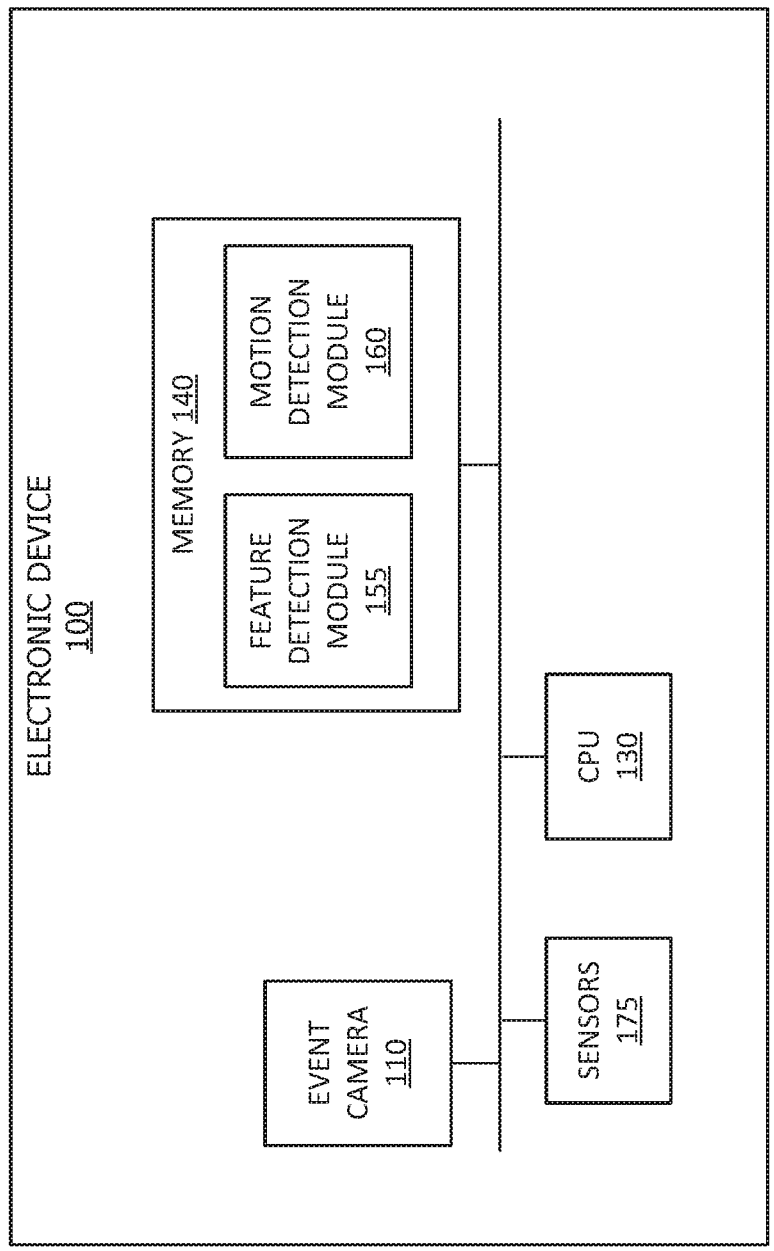
FIG. 1 shows, in block diagram form, a simplified electronic device according to one or more embodiments.

This disclosure is directed to systems, methods, and computer readable media for utilizing optical flow from an event camera. In general, techniques are disclosed to determine a motion, such as a velocity, of an object, based on a received optical flow. That is, according to one or more embodiments, an object may be detected in an image. Pixels corresponding to that object may be detected, and a change in brightness of those pixels may be determined, for example, using an event camera. An event may be detected when a brightness of a particular pixel changes. Each event may provide the coordinates of the pixel, the brightness change direction, and a timestamp for a time at which the event is detected. An optical flow algorithm may use the coordinate of the pixel, brightness change direction, and timestamp to compute a velocity of movement of the object in pixels per second. Thus, by analyzing the flow of a set of pixels that correspond to a moving object, a velocity of the object may be determined.

In addition, once the velocity of an object is determined, the data may be used to supplement an image of the object captured by a traditional camera, according to one or more embodiments. As an example, while an object is in motion, a traditional camera may be only able to capture 60 frames per second. Thus, the exact location of the object between frames is lost. Using the determined velocity of the object and known locations of the object at given times, a more exact location of the object may be calculated at any given time. Thus, the image data of the frames captured by the traditional camera may be supplemented according to the calculated velocity of the object. In one or more embodiments, optical flow may be utilized for detecting the movement of objects in the real world. As an example, unexpected movement based on head movement may be detected. In another embodiments, optical flow may be utilized for tracking algorithms. As an example, if a machine-learned person detector runs at a certain rate, such as 10 frames per second, optical flow can be used to track the person between detections.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of event capture having the benefit of this disclosure.

For purposes of this disclosure, the term "event camera" refers to a camera which provides a continuous stream of events associated with brightness changes.

For purposes of this disclosure, the term "event" is a brightness change event. Each event may include pixel coordinates for a pixel at which the event is detected, a timestamp at which the event is detected, and a polarity which indicates a direction in change of brightness.

For purposes of this disclosure, the term "event stream" refers to a brightness indication for one or more pixels at two or more times.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, wearable device, or any other electronic device that includes a camera system.

FIG. 1 shows, in block diagram form, an overall view of a system diagram capable of supporting utilization of optical flow, according to one or more embodiments. Specifically, FIG. 1 depicts an electronic device 100 that is a computer system. Electronic device 100 may be connected to other network devices across a network, such as mobile devices, tablet devices, desktop devices, as well as network storage devices such as servers and the like.

Electronic Device 100 may include a central processing unit (CPU) 130. Processor 130 may be a system-on-chip such as those found in mobile devices and include one or more dedicated graphics processing units (GPUs). Further processor 130 may include multiple processors of the same or different type. Electronic Device 100 may also include a memory 140. Memory 140 may each include one or more different types of memory, which may be used for performing device functions in conjunction with CPU 130. For example, memory 140 may include cache, ROM, and/or RAM. Memory 140 may store various programming modules during execution, including feature detection module 155 and motion detection module 160.

Electronic device 100 may also include one or more cameras, such as event camera 110. According to one or more embodiments, electronic device 100 may identify a change in brightness at any given pixel and record a timestamp and pixel location when the change in brightness is identified. Each camera may each include an image sensor, a lens stack, and other components that may be used to capture images and/or identify a change in brightness at any given pixel and record a timestamp and location when the change in brightness is identified.

Although electronic device 100 is depicted as comprising the numerous components described above, in one or more embodiments, the various components may be distributed across multiple devices. Further, additional components may be used, some combination of the functionality of any of the components may be combined.

In one or more embodiments, feature detection module is configured to identify a feature in an image. In one or more embodiments, feature detection module 155 may detect a feature of an object in an image captured by a traditional camera, or based on an event stream, or both. The feature detection module 155 may, for example, detect a feature, identify feature descriptors for the feature, and identify the feature based on the descriptors.

In one or more embodiments, the motion detection module 160 may determine a motion of an object based on changes in brightness over time. According to one or more embodiments, the motion detection module 160 may receive an event stream from an event camera 110, and analyze a pattern of changes in brightness over time to determine motion of an object. The motion detection module 160 may analyze the changes in brightness over a subset of pixels, such as pixels associate with a particular object or feature of an object, to determine a velocity of the object. That is, the event flow may provide indications of a change in brightness at a particular pixel along with a timestamp identifying when the event (i.e., change in brightness) occurred. By analyzing a subset of pixels in an image, the motion of a particular feature may be calculated.

Figure 2:
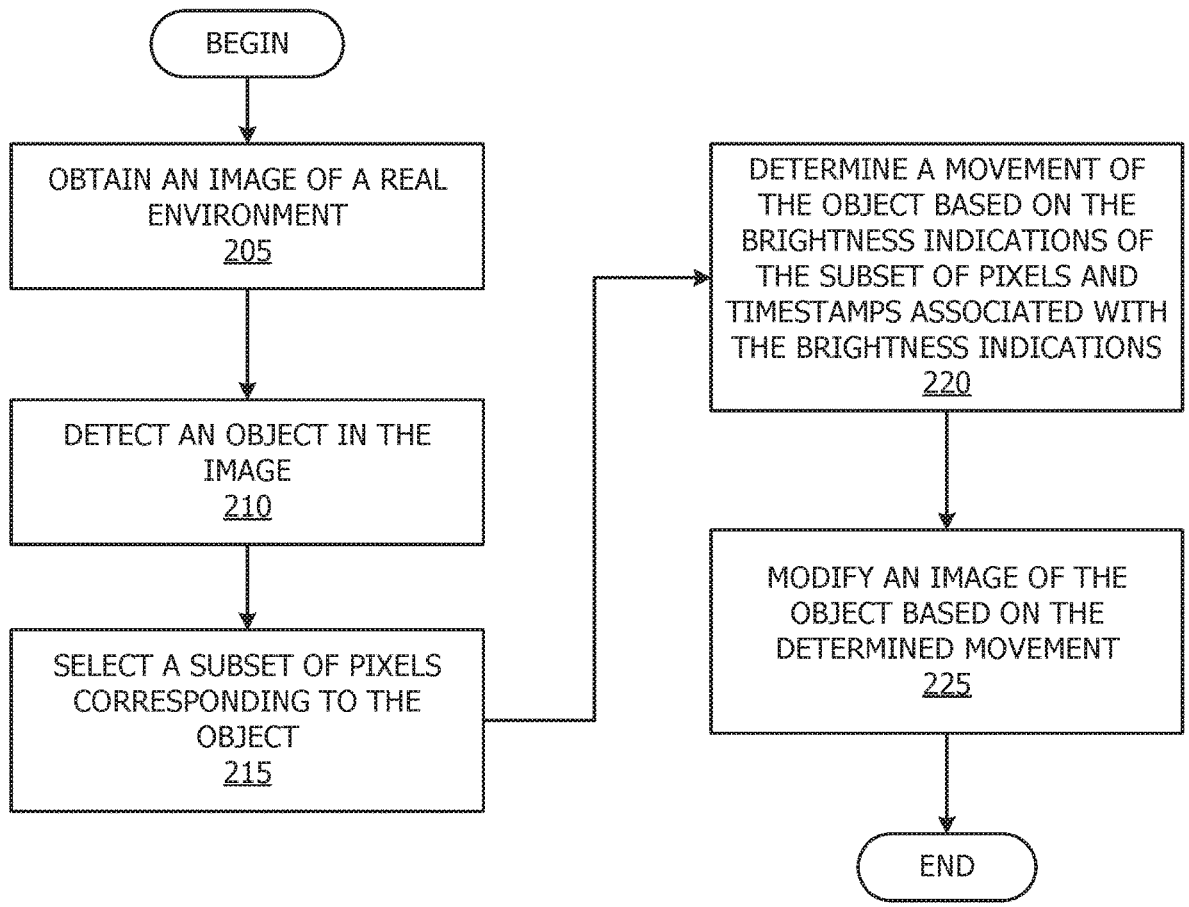
FIG. 2 shows, in flow chart form, an example method for modifying an image based on a determined motion of an object, according to one or more embodiments.

FIG. 2 shows, flow chart form, an example method for determining optical flow from a camera based on a determined motion of an object, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 205 where the electronic device 100 obtains an image of a real environment. In one or more embodiments, the image may be captured by a traditional camera that is part of the electronic device 100. Alternatively, or additionally, the image may be captured by a camera operatively connected to the electronic device 100.

The flow chart continues at 210, and an object is detected in the image. According to one or more embodiments, the object may be detected using feature detection. Further, according to one or more embodiments, an edge of the object may be detected. Changes of brightness at a particular pixel location may be more detectable when the edge of an object passes through space rather than the middle of an object.

According to one or more embodiments, detecting an object in the image may involve multiple processes. For example, initially a feature may be extracted from the image, and a feature descriptor for the extracted feature may be identified. In one or more embodiments, the feature descriptor may be used to identify the object, or the feature of the object.

The flow chart continues at 215 and a subset of pixels is selected. According to one or more embodiments, the subset of pixels may correspond to pixels in the image within which the object or feature of the object was detected in 210. According to one or more embodiments, tracking movement within a small number of pixels of an image may provide preferable results if there are multiple objects moving in a scene. That is, a smaller subset of pixels will likely result in less false matches in an event flow.

At 220, the motion detection module 160 may determine a movement of the object based on the brightness indications of the subset of pixels over time, for example using timestamps recording at the time the change in brightness was detected. In one or more embodiments, depending on the pixels that experience a change in brightness at particular times, a velocity of the object or feature of the object may be determined. As an example, as the object passes over a background of a real environment, the edge of the object may cause a change in the brightness of pixels as it moves through space. Thus, by evaluating the location of the pixels experiencing a change in brightness along with their timestamps, a velocity may be determined. For example, if the timestamps of the events in the neighboring pixels are far apart, then the detected object is moving slowly, whereas timestamps that are closer together indicate a more rapid motion.

In one or more embodiments, events of a similar polarity (i.e., direction of change of brightness) may be grouped together to calculate or otherwise determine velocity. For example, events where the direction of the change in brightness are the same may be considered when determining velocity. Thus, flow may be computed separately for events with positive polarity from events with negative polarity. Computing flow separately based on polarity may improve robustness in determining movement and velocity of an object. In one or more embodiments, once a velocity estimate is determined for the positive polarity pixels, and a velocity estimate is determined for the negative polarity pixels, then the two velocity estimates may be considered together into an overall velocity estimate for the object.

According to one or more embodiments, any number of methods may be used to determine velocity. As an example, in many cases, an edge moving through space may not be a straight line. Thus, gradients over different slices of time of an event flow may be analyzed to determine a velocity of the object. Further, in one or more embodiments, a filtering algorithm may be applied to reduce noise or compensate for missing data. In one or more embodiments, a least squares approach may be utilized to find the best fit across changes in brightness that appear to be moving from one time to the next. In another example, convolution filters may be used, such as 3×3 or 5×5 Sobel gradients, over the pixel timestamps in order to compute an estimate velocity measured in seconds per pixel, which may then be converted to pixels per second. According to one or more embodiments the determined movement of the object or objects may result in an optical flow, or velocity flow. Thus, the speed and direction of movement may be expressed for part or all of the scene.

The flow chart continues at 225, and the image of the real environment is modified based on the determined movement of the object. As an example, if a ball is moving through space, the traditional camera may only capture the image of the ball at finite points in time, such as 60 frames per second. In one or more embodiments, the image may be modified to place the object in the position in which it should be at any particular time. That is, the ball may be placed in a position that is not captured by a traditional camera, by capturing at the pixel level, when the ball is moving through space. Optical flow may provide additional capabilities. Returning to the example of the ball, a 3D velocity of the ball may be determined as it moves through space based on the change in brightness and timestamps captured by events associated with the ball's movement.

Figure 3:
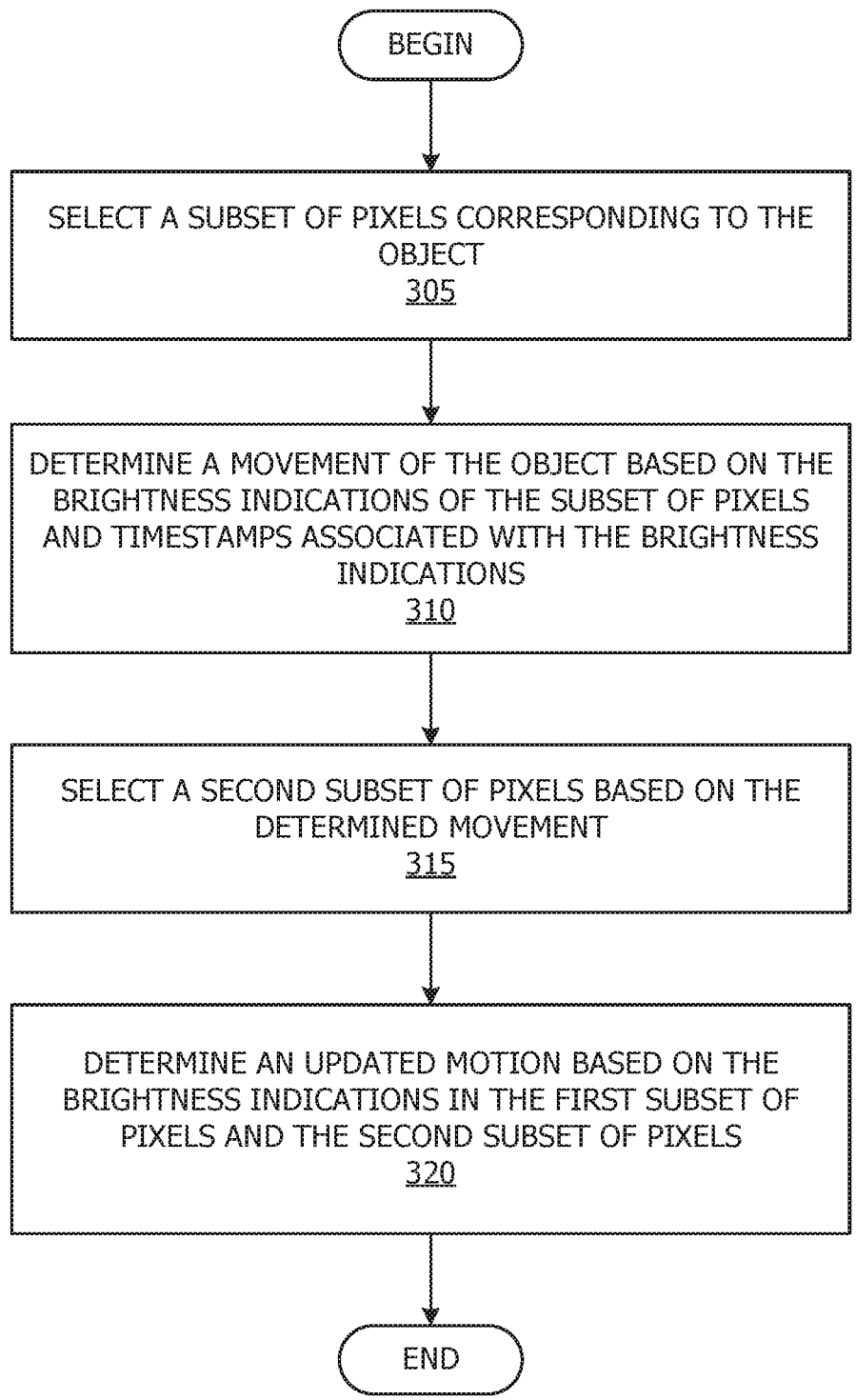
FIG. 3 shows, flow chart form, method for determining a motion of an object based on a tracked change in brightness of pixels corresponding to a feature of the object, according to one or more embodiments.

FIG. 3 shows, flow chart form, method for determining a motion of an object based on a tracked change in brightness of pixels corresponding to a feature of the object, according to one or more embodiments. According to one or more embodiments, determining velocity of an object in an environment may work better using a smaller number of pixels as a sample space. However, in one or more embodiments, an original subset of pixels selected may be insufficient to calculate a velocity of an object.

The flow chart begins at 305, and an initial subset of pixels corresponding to the object is selected. In one or more embodiments, any method may be used, such as those described above with respect to 215. As described above, the subset of pixels may include a portion of an object, such as a feature of an object identified using feature detection techniques.

The flow chart continues at 310, and a movement of the object is determined based on the brightness indications of the subset of pixels and considering the timestamp associated with each event. As described above, there are numerous processes that may be utilized to determine the velocity of the object. In one or more embodiments, it may be determined that additional pixels should be utilized to determine a velocity of the object. For example, the object may move outside of the selected subset of pixels without enough data to identify a velocity. As described above, it may be preferable to select a very small subset of pixels, but as the object moves through space, a larger subset of pixels may be preferable. As another example, the object may change directions, or there may be too much noise in the initial data set.

If it is determined that additional pixels should be considered in determining the velocity of the object, then the flow chart continues at 315, and a second subset of pixels is selected based on the determined, or undetermined, movement. As an example, if the initial subset of pixels provides an initial guess at velocity, then the second subset of pixels may be selected in a direction corresponding to the initial guess of the velocity. As another example, if the initial subset of pixels is too small to determine a velocity of an object, then simply a larger number of pixels may be selected. The second subset of pixels may be completely different from the initial subset of pixels, or partially overlapping.

The flow chart continues at 320 and an updated motion is determined based on the brightness indications in the first subset of pixels and the second subset of pixels over time. As described above, the first subset of pixels and the second subset of pixels may be partially or completely overlapping, and may vary based on time stamp. As an example, the change in brightness may be analyzed for the initial subset of pixels for a first time, or a first period of time, and change in brightness may be analyzed for a second subset of pixel for a second time or a second period of time. Then, the motion may be determined as described above with respect to 220.

Figure 4:
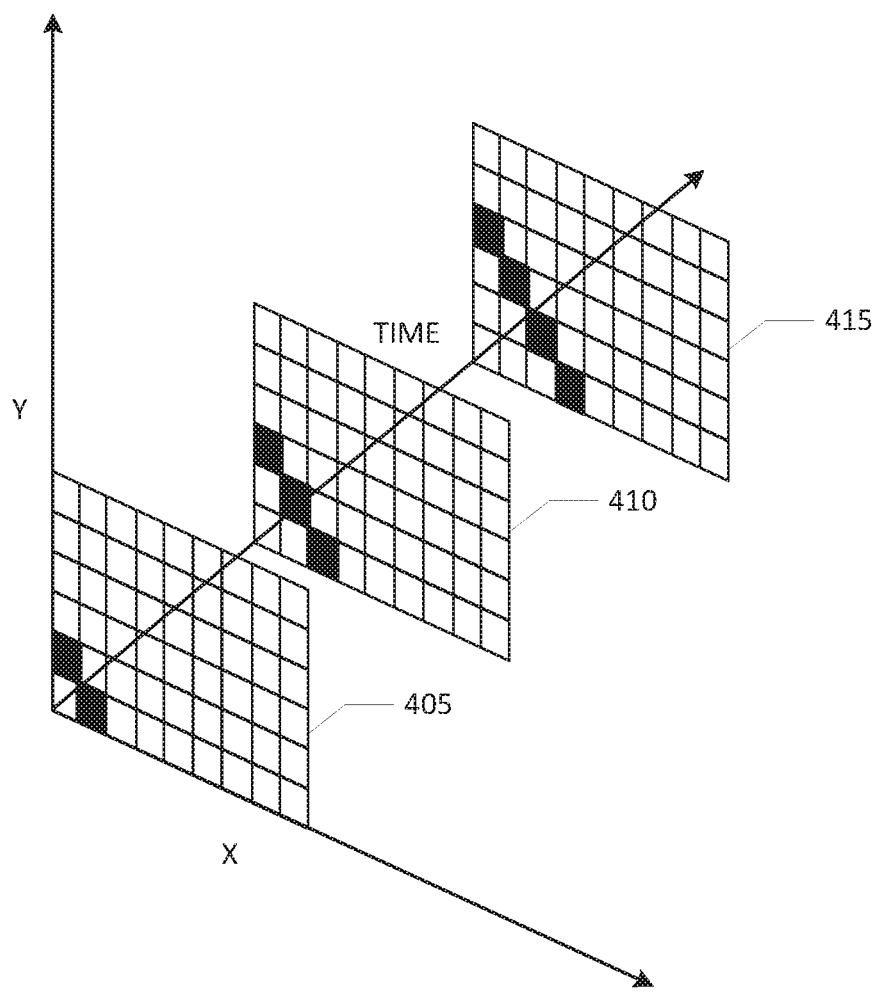
FIG. 4 shows, in chart form, an example event flow used to determine velocity of an object, according to one or more embodiments.
Figure 4:
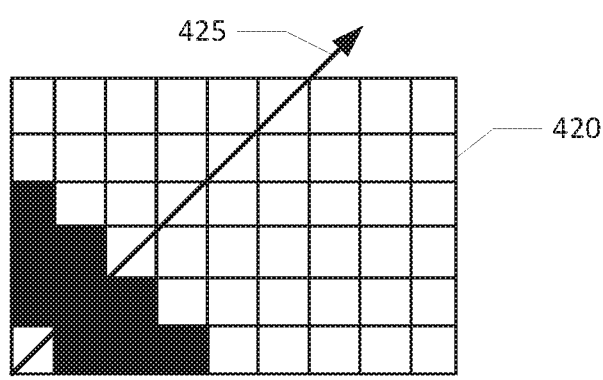

FIG. 4 shows, in chart form, an example event flow used to determine velocity of an object, according to one or more embodiments. FIG. 4 shows a depiction of event frames 405, 410, and 415 over time. It should be understood that the various event frames are not actual frames captured by a camera. Rather, the depicted event frames 405, 410, and 415 depict, for each of a subset of pixels of an image, whether a brightness has changed at a particular time. According to one or more embodiments, the various subset of pixels may be expressed as a collection of data sets indicating a timestamp corresponding to a change in brightness of a particular pixel at a particular location. In one or more embodiments, pixel locations may be defined by pixel coordinates within an image or on a sensor.

For purposes of the example, an indication in change in brightness is depicted by a gray box. Further, for purposes of the example, several shades of gray are depicted as representing changes in brightness captured at similar times. Thus, all changes of brightness captured at T1 are depicted as a lighter shade of gray as changes of brightness captured at T2, and so on. However, the shade of gray is not intended to have any relationship to any particular brightness, or change of brightness, just that a change of brightness exists. However, in one or more embodiments, different differentials in brightness could be expressed differently.

As depicted in FIG. 4, a subset of pixels is shown over time. Pixel subset 405 depicts example changes in brightness occurring in a lower left corner. At a second time, the subset of pixels 410, shows a change in brightness occurring slightly inward from the lower left corner. Similarly, the subset of pixels at 415, may depict the change in brightness moving even more inward from the lower left corner. According to one or more embodiments, the change in brightness could be associated with an object or a feature of an object passing over a background, or otherwise moving in a scene. For example, the edge of an object may cause a change in brightness of pixels as it moves across a scene. Thus, by tracking the apparent movement of the change in brightness, a movement of the object may be determined.

Grid 420 depicts a composite image of the subset of pixels 405, 410, and 415 over time. Considering that each different shade of gray is associated with a different time stamp, the apparent velocity associated with the change of brightness, and thus the object, may be determined, as depicted by the arrow moving across the pixel set. The determination of the exact direction of the velocity may include a filtering algorithm to reduce noise or compensate for missing data. Further, a minimization of squares approach may be applied to determine a velocity based on a gradient of the change in brightness from one event frame to the next.

Figure 5:
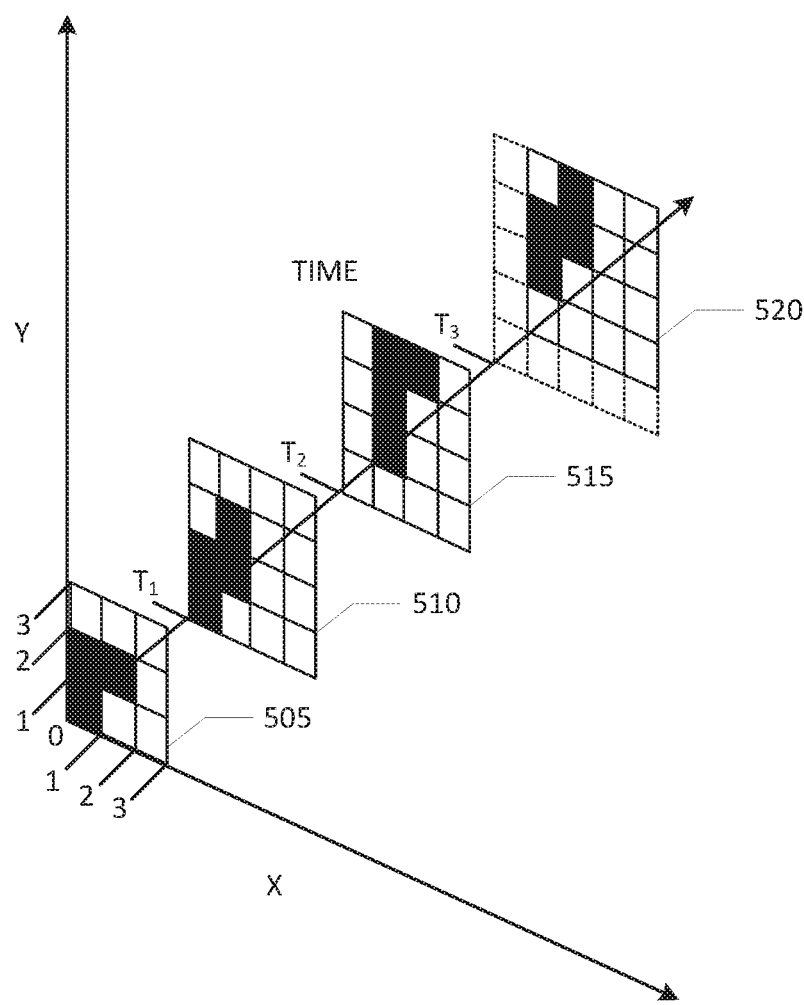
FIG. 5 shows, in chart form, an example dynamic event flow used to determine velocity of an object, according to one or more embodiments.
Figure 5:
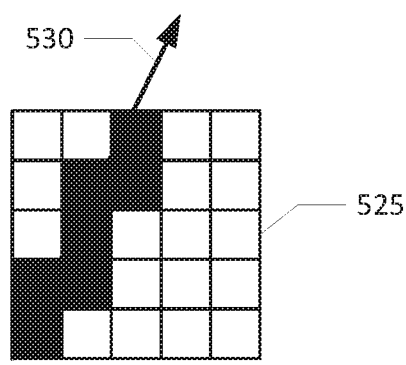

FIG. 5 shows, in chart form, an example dynamic event flow used to determine a velocity of an object, according to one or more embodiments. More specifically, FIG. 5 depicts an example of an event flow over a period of time T0-T3 during which the subset of pixels is dynamically modified. As shown, event frame 505 includes nine pixels, with a change in brightness detected at three pixels. For purposes of this example, it could be determined that the initial set of pixels is insufficient. Thus, at 510, a set of 16 pixels is considered at T2. The same subset of pixels is also considered at 515, where there is an apparent movement of the indication of a change in brightness. Then, at 520, a different subset of pixels is considered. According to one or more embodiments, the apparent direction of the change in brightness may indicate that the nine pixels at the left edge and bottom edge are no longer needed.

Similar to that in FIG. 4, chart 525 depicts a composite of all subset of pixels over time, with different timestamps indicated by different shades of gray. Using a variety of methods as described above, the velocity 530 of the object may be determined. According to one or more embodiments, determining the velocity may involve considering pixels from multiple subsets, as shown.

Figure 6:
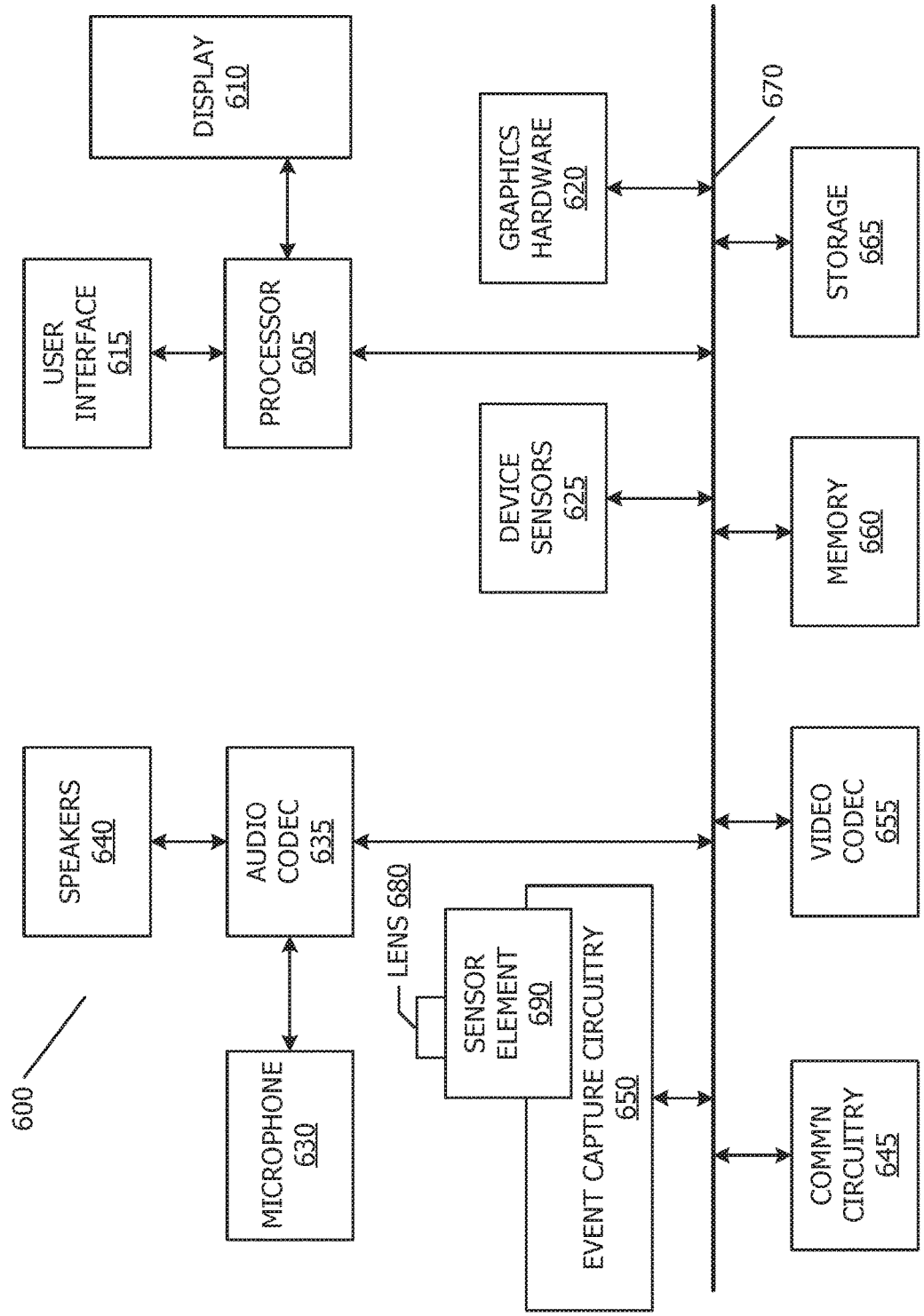
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, event capture circuitry 650 (e.g., including camera system) video codec(s) 655 (e.g., in support of event capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Event capture circuitry 650 may scan rows and columns of pixels to detect whether those pixels have detected brightness changes. If events are detected, the event capture circuitry 650 assigns timestamps to the event, and transmits the events over the bus. In one or more embodiments, the image capture circuitry 650 may perform event compression, noise filtering, and the like prior to transmission. Events so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for determining a movement of an object, comprising:
   obtaining an event stream corresponding to a scene over time, wherein the event stream comprises a plurality of events associated with detected changes in brightness, wherein each event comprises a timestamp indicating a time at which the change in brightness is detected for a pixel, and a brightness indication identifying a direction of the change in brightness for the pixel;
   selecting a first subset of pixels from a plurality of pixels corresponding to an object for a first time period;
   determining a first movement of the object based on the brightness indications and corresponding timestamps for the first subset of pixels;
       selecting, based on the determined first movement, a second subset of pixels associated with the object for a second time period;
   and
   generating a velocity measure based on events corresponding to the first subset of pixels and the second subset of pixels.

2. The method of claim 1, wherein selecting a first subset of pixels comprises:
   receiving an image of the object;
   extracting one or more features of the object; and
   identifying the first subset of pixels as one or more pixels that include the one or more features of the object.

3. The method of claim 1, wherein determining a first movement of the object comprises:
   comparing a brightness indication of at least some of the first subset of pixels at a first time with a brightness indication of the at least some of the first subset of pixels at a second time using timestamps corresponding to the at least some of the first set of pixels.

4. The method of claim 3, wherein the second subset of pixels comprises a greater number of pixels than the first subset of pixels.

5. The method of claim 1, wherein the pixel location comprises a set of coordinates for the pixel.

6. The method of claim 1, wherein the second subset of pixels includes one or more pixels of the first subset of pixels.

7. The method of claim 1, wherein the first subset of pixels corresponds to an edge of the object.

8. A computer readable medium for determining a movement of an object, comprising computer readable code executable by one or more processors to:
   obtain an event stream corresponding to a scene over time, wherein the event stream comprises a plurality of events associated with detected changes in brightness, wherein each event comprises a timestamp indicating a time at which the change in brightness is detected for a pixel, and a brightness indication identifying a direction of the change in brightness for the pixel;
   select a first subset of pixels from a plurality of pixels corresponding to an object for a first time period;
   determine a first movement of the object based on the brightness indications and corresponding timestamps for the first subset of pixels;
       select, based on the determined first movement, a second subset of pixels associated with the object for a second time period;
   and
   generate a velocity measure based on events corresponding to the first subset of pixels and the second subset of pixels.

9. The computer readable medium of claim 8, wherein the computer readable code to select a first subset of pixels comprises computer readable code to:
   receive an image of the object;
   extract one or more features of the object; and
   identify the first subset of pixels as one or more pixels that include the one or more features of the object.

10. The computer readable medium of claim 8, wherein the computer readable code to determine a first movement of the object comprises computer readable code to:
    compare a brightness indication of at least some of the first subset of pixels at a first time with a brightness indication of the at least some of the first subset of pixels at a second time using timestamps corresponding to the at least some of the first set of pixels.

11. The computer readable code of claim 8, wherein the second subset of pixels comprises a greater number of pixels than the first subset of pixels.

12. The computer readable code of claim 8, wherein the pixel location comprises a set of coordinates for the pixel.

13. The computer readable code of claim 8, wherein the second subset of pixels includes one or more pixels of the first subset of pixels.

14. The computer readable code of claim 8, wherein the first subset of pixels corresponds to an edge of the object.

15. A system for determining a movement of an object, comprising:
    an event camera;
    one or more processors; and
    a storage device coupled to the one or more processors and comprising computer readable code executable by one or more processors to:
       obtain an event stream corresponding to a scene over time, wherein the event stream comprises a plurality of events associated with detected changes in brightness, wherein each event comprises a timestamp indicating a time at which the change in brightness is detected for a pixel, and a brightness indication identifying a direction of the change in brightness for the pixel;
       select a first subset of pixels from a plurality of pixels corresponding to an object for a first time period;
       determine a first movement of the object based on the brightness indications and corresponding timestamps for the first subset of pixels;
           select, based on the determined first movement, a second subset of pixels associated with the object for a second time period;
       and
       generate a velocity measure based on events corresponding to the first subset of pixels and the second subset of pixels.

16. The system of claim 15, wherein the computer readable code to select a first subset of pixels comprises computer readable code to:
    receive an image of the object;
    extract one or more features of the object; and
    identify the first subset of pixels as one or more pixels that include the one or more features of the object.

17. The system of claim 15, wherein the computer readable code to determine a first movement of the object comprises computer readable code to:
    compare a brightness indication of at least some of the first subset of pixels at a first time with a brightness indication of the at least some of the first subset of pixels at a second time using timestamps corresponding to the at least some of the first set of pixels.

18. The system of claim 15, wherein the second subset of pixels comprises a greater number of pixels than the first subset of pixels.

19. The system of claim 15, wherein the pixel location comprises a set of coordinates for the pixel.

20. The system of claim 15, wherein the first subset of pixels corresponds to an edge of the object.

* * * * *